(12) United States Patent
Mellor et al.

(10) Patent No.: US 7,066,429 B2
(45) Date of Patent: Jun. 27, 2006

(54) APPARATUS AND METHOD FOR PREDICTABLE MOVEMENT OF STRUCTURAL COMPONENTS DURING FAILURE

(75) Inventors: Mitchell L. Mellor, Bothell, WA (US); Christopher A. Reitz, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 62 days.

(21) Appl. No.: 10/877,597

(22) Filed: Jun. 25, 2004

(65) Prior Publication Data

US 2006/0006282 A1    Jan. 12, 2006

(51) Int. Cl.
*B64C 25/10* (2006.01)

(52) U.S. Cl. .............................. 244/102 R; 244/102 SL
(58) Field of Classification Search ............ 244/102 A, 244/102 R, 100 R, 102 SL
See application file for complete search history.

(56) References Cited

U.S. PATENT DOCUMENTS

| 2,661,171 A | * | 12/1953 | Allen ................... 244/102 SL |
| 2,668,030 A | * | 2/1954 | Smith et al. ........... 244/102 SL |
| 4,087,062 A | | 5/1978 | Masclet |
| 4,155,522 A | * | 5/1979 | Sealey ................... 244/102 R |
| 4,328,939 A | * | 5/1982 | Davies et al. ........... 244/102 R |

* cited by examiner

*Primary Examiner*—Peter M. Poon
*Assistant Examiner*—T D. Collins
(74) *Attorney, Agent, or Firm*—Marshall, Gerstein & Borun LLP

(57) ABSTRACT

A system and method is provided for directing a separation sequence of structural components, such as, for example, aircraft landing gear components, during an overload condition. This system and method may be used to stop a component in rotation and thereby allow the component to fail in a predictable and controllable manner. This system and method may be used on any type of device that utilizes components that rotate relative to one another and/or that has components that rotate during an overload condition.

8 Claims, 11 Drawing Sheets

APPARATUS AND METHOD FOR PREDICTABLE MOVEMENT OF STRUCTURAL COMPONENTS DURING FAILURE

FIELD OF THE INVENTION

The invention is generally related to overload release devices, and is specifically related to overload release devices for aircraft landing gear.

BACKGROUND

It is common to design structural components of devices, such as, for example, aircraft structural components, to withstand predicted loads plus a safety factor or overload factor. Even with safety factors, on occasion, the structural components can be stressed beyond their ability to withstand the predicted load plus the safety factor. In aircraft structures, it is desirable to protect occupants as much as possible (e.g. by minimizing the risk of fire), even during and after catastrophic failure of structural components of the aircraft. In such cases, the components are designed to fail in a predictable manner so as to minimize both damage to the aircraft and danger to the occupants.

One practice is to use fuse pins which fail at a predictable load. A fuse pin is a pin which is used to connect two structural components. The fuse pin connects the structural components such that when the design tensile or compressive load is exceeded, shear stress will cause the pin to fail thereby releasing the two structural components from one another. Fuse pins typically work well for structural components that are primarily subjected to tension or compression loads during overload; however, for structural components in rotation at the time of an overload, failure may be difficult to control.

Another practice is to design structural components to deform during the overload condition thereby absorbing some of the energy of the overload condition. An example of this practice in the automotive industry is the use of "crumple zones" in the front of an automobile to absorb some of the energy of an impact. Similarly, in the aircraft industry, an engine nacelle may be designed to deform and absorb some vertical load in a particular scenario, such as, for example, a gear up landing, thereby protecting the fuselage from excessive vertical loads. Deformation is a good way to absorb energy, but this technique will not always result in structural components failing in a predictable manner.

The invention is directed to overcoming one or more of the problems or disadvantages associated with the prior art.

SUMMARY

According to one aspect of the invention, an aircraft landing gear assembly includes a shock strut, a drag strut with a stop tab and a drag strut spindle having a rotational stop. During an overload condition, the stop tab may engage the rotational stop preventing the drag strut from rotating further. The overload forces may be then be transferred to the drag strut as a bending moment and the drag strut may materially fail in bending.

The invention limits rotation of a component such that the component may fail materially in a predictable fashion. The device may use a restricting mechanism to stop or limit rotation during an overload condition. The restricting mechanism may be any mechanism which restricts rotation including stop tabs and rotational stops, a disk, band or drum type brake, a clutch, a pin, or any other device or method which can be used to stop or limit rotation. The component may be designed to fail in tension, buckling, bending, shear and/or any other predictable failure mode. In this way, component failure may be controlled thereby reducing damage and danger to an acceptable level.

The features, functions, and advantages can be achieved independently in various embodiments of the present invention or may be combined in yet other embodiments.

DETAILED DESCRIPTION OF THE INVENTION

The invention may be used to sequence and control the separation of vehicle components in rotation during an overload condition. The rotation may be stopped or limited by, for example, a stop tab and rotational stop, a brake (disk, drum, band, or any other type of brake), a clutch, a pin, and/or any other method of limiting rotation. The structural component may be designed to fail in a predictable manner, once rotation is stopped or limited. The structural component may be designed to fail in tension, buckling, bending, shear, and/or any other predictable mode of failure. Determining the failure mode and failure load may help control the sequence of failures of systems having multiple structural components such that damage to the vehicle and danger to the vehicle occupants may be reduced to an acceptable level.

Figure 1:
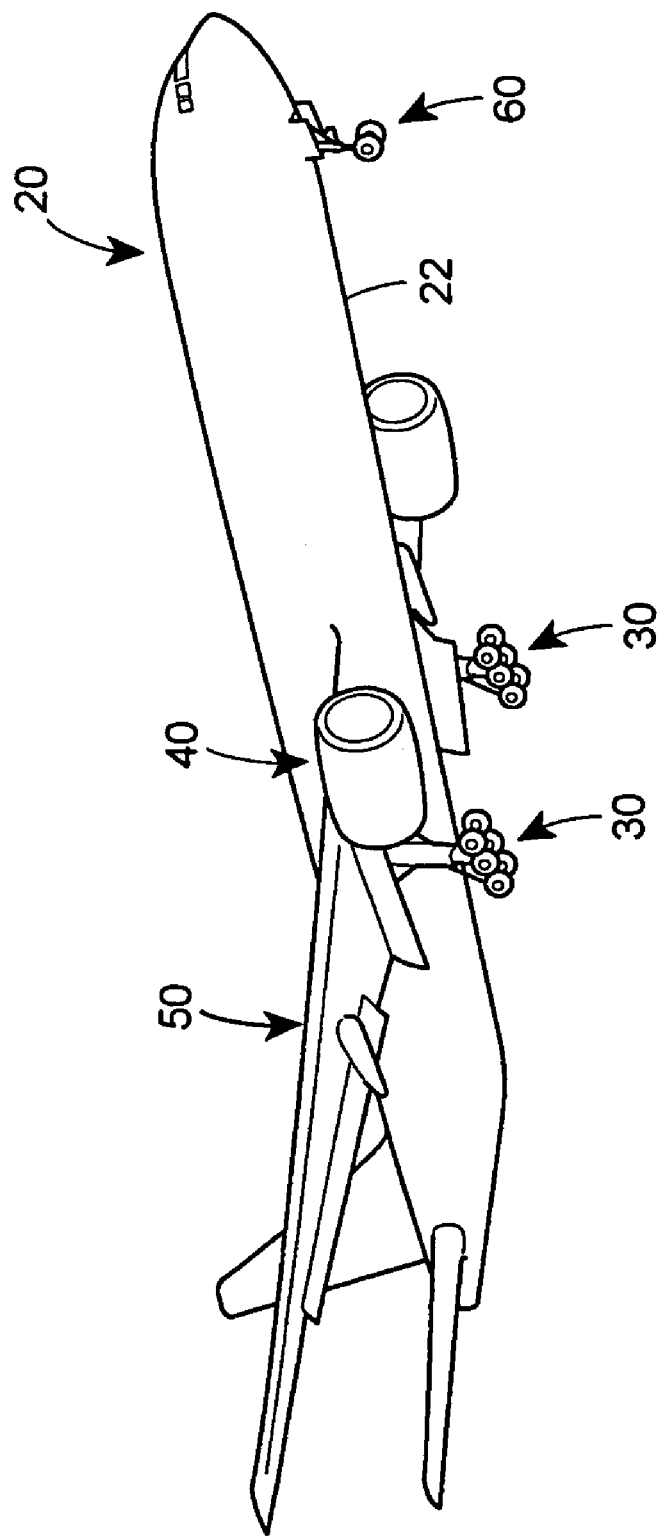
FIG. 1 is an overview of an aircraft, showing the location of a landing gear assembly.

Referring now to the figures, FIG. 1 shows an aircraft 20 and various aircraft components. The fuselage 22, the main landing gear assembly 30, the engines 40, the wings 50, the nose landing gear 60 and the relative position of each component on the aircraft 20 are shown.

Figure 2:
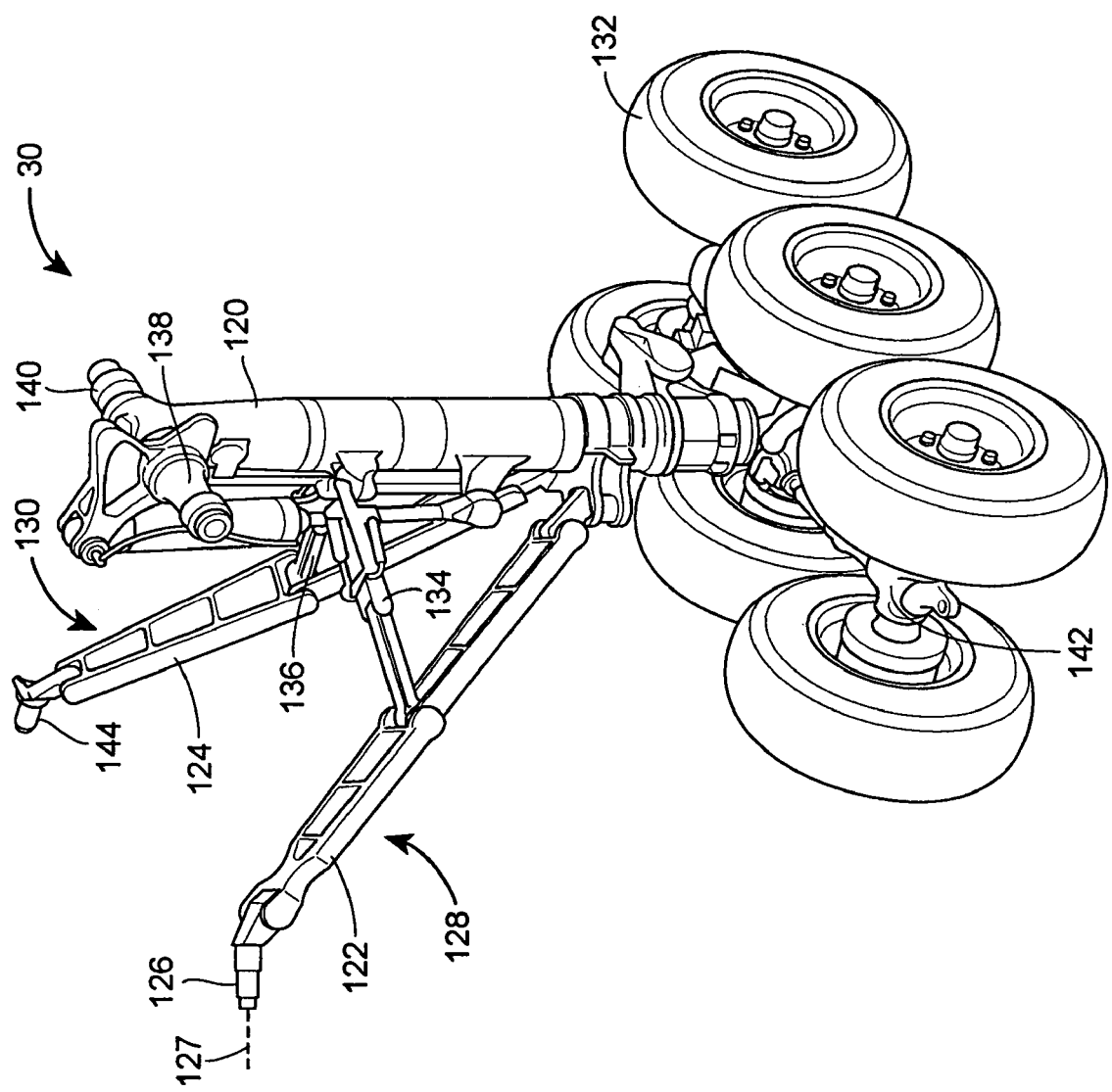
FIG. 2 is an isometric view of the landing gear assembly of FIG. 1.

FIG. 2 shows one embodiment of the main landing gear assembly 30 and the various components that make up the main landing gear assembly 30. The shock strut 120 absorbs the vertical load during normal landing operations, it may be connected to the aircraft 20 at a forward trunnion 138 and an aft trunnion 140. At the opposite end, of the shock strut 120 from the forward trunnion 138 and aft trunnion 140, the shock strut 120 may be connected to a truck assembly 142. A plurality of wheels 132 may be connected to the truck assembly 142.

The drag strut assembly 128 may include a drag strut 122 and an optional drag strut lock link 134. The drag strut assembly 128 may be connected to the aircraft at a spindle 126 which may allow rotation about a spindle axis 127 during landing gear retraction. The drag strut 122 may carry drag loads on the main landing gear assembly 30 during normal operations. At the opposite end from the spindle 126, the drag strut 122 may be connected to the shock strut 120. The drag strut 122 may include at least one structural component. The drag strut 122 may be connected between the two ends to the shock strut 120 through a drag strut lock link 134. The drag loads transfer to the drag strut 122 as tensile loads.

The side brace assembly 130 may include a side brace 124 which may be connected to the aircraft through a side brace spindle 144 at one end. At the other end, the side brace 124 may be connected to the shock strut 120. The side brace 124 carries side loads during normal operations of the main landing gear assembly 30. The side brace 124 may be connected to the shock strut 120 at a point between the two ends by a side brace lock link 136.

Figure 3:
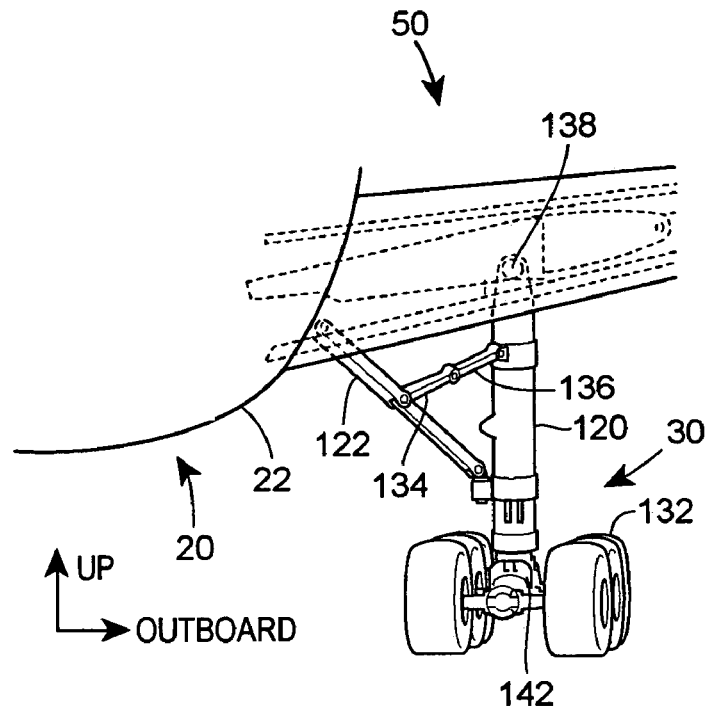
FIG. 3 is a front view of the landing gear assembly of FIG. 1.

FIG. 3 shows the embodiment from FIG. 2 as viewed from the front of the aircraft 20 looking rearward. This figure shows the aircraft 20 and the main landing gear assembly 30 and the main landing gear assembly 30 attachment to both the fuselage 22 and the wing 50. The side brace 124 is hidden behind the drag strut 122 in this view.

Figure 4:
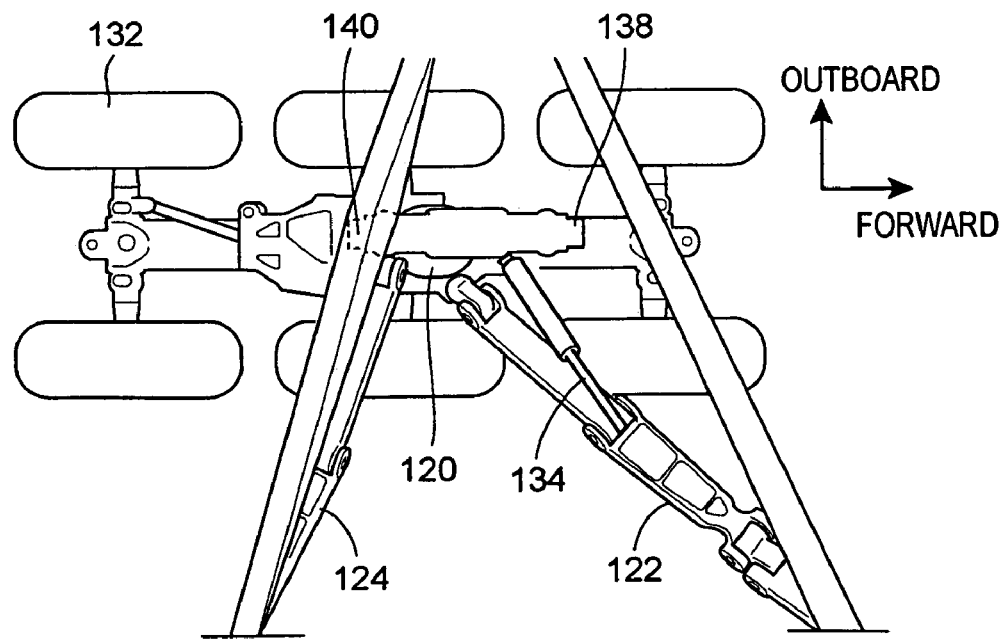
FIG. 4 is a plan view of the landing gear assembly of FIG. 1.

FIG. 4 shows the embodiment of FIG. 2 and FIG. 3 in a top down view. In this view the drag strut 122 and side brace 124 can be seen along with their relationship to one another. The drag strut 122 may be connected to the side of the aircraft 20 at a point forward of the side brace 124.

Figure 5:
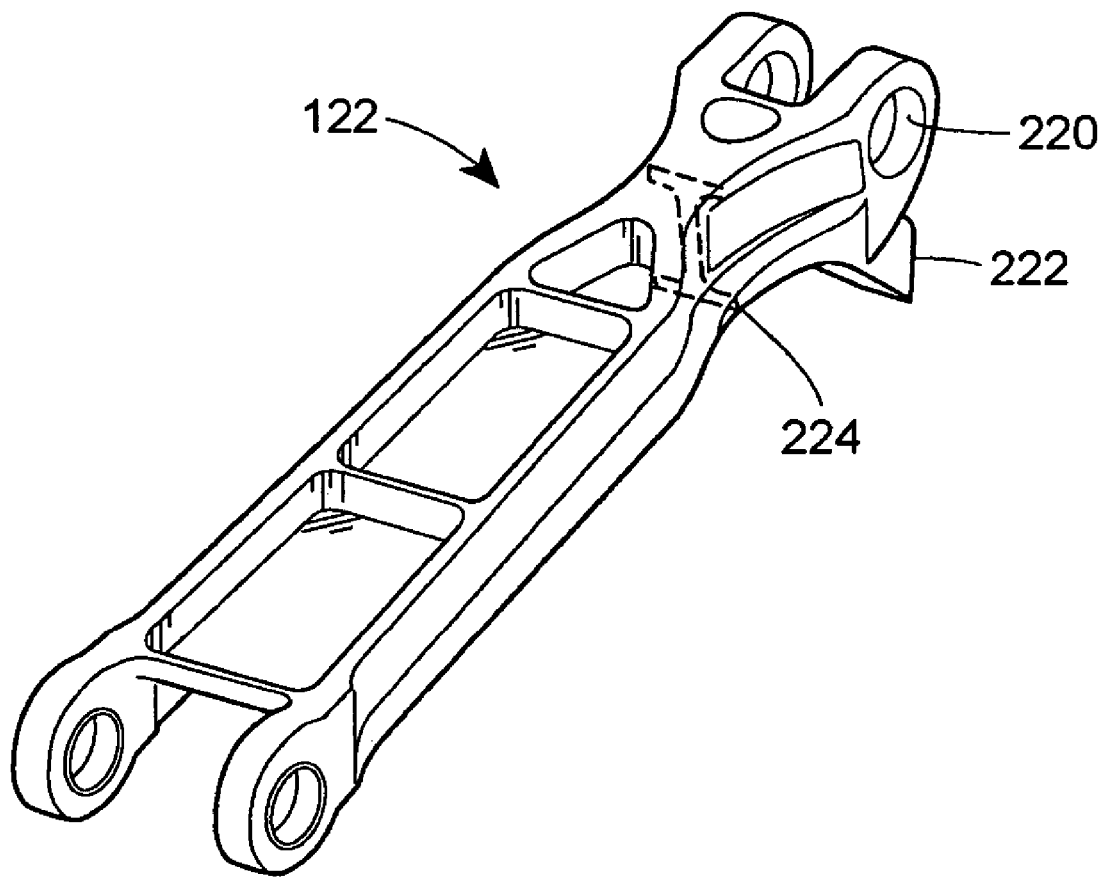
FIG. 5 is an isometric view of one embodiment of a drag strut.

FIG. 5 shows an embodiment of the drag strut 122. At one end of the drag strut 122, fuse pin holes 220 and a stop tab 222 are shown. A necked down I-beam section 224 may be shown just below the fuse pin holes 220 and the stop tab 222. The necked down I-beam section 224 may be arranged so that a weak bending axis is perpendicular to an axis drawn through the center of both fuse pin holes 220 and also perpendicular to a longitudinal axis of the drag strut 122.

Figure 6:
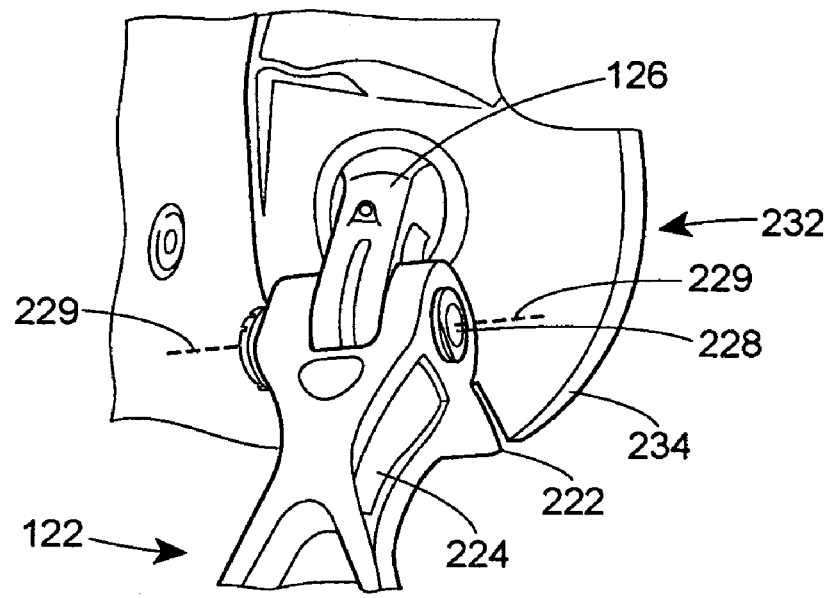
FIG. 6 is an enlarged isometric view of the top of the drag strut, a spindle and a drag strut spindle fitting.

FIG. 6 is an enlarged isometric view of the top of the drag strut 122, the spindle 126 and the drag strut spindle fitting 232. The fuse pin 228 attaches the drag strut 122 to the spindle 126. The spindle 126 may be attached to the drag strut spindle fitting 232 such that it may be able to rotate about the spindle axis 127 (see FIG. 7). The necked down I-beam section 224 may be below the fuse pin 228. The stop tab 222 in this embodiment is shown as part of the drag strut 122; however the stop tab 222 may be a separate component. The drag strut spindle fitting 232 contains a drag strut spindle fitting rotational stop 234.

When the drag strut 122 rotates in a counter-clockwise direction (as viewed in FIG. 6) about the spindle 126 before pivoting in a clockwise direction about the fuse pin 228 (as viewed in FIG. 7), the stop tab 222 may contact the drag strut spindle fitting rotational stop 234 and may prevent further relative movement of the drag strut 122 about the spindle 126. In this embodiment, the drag strut 122 may rotate counter-clockwise (as viewed in FIG. 6) about the spindle axis 127 without pivoting clockwise (as viewed in FIG. 7) about the fuse pin 228 during an overload condition. During normal main landing gear retraction, the drag strut 122 may pivot clockwise (as viewed in FIG. 7) about the fuse pin 228, thereby moving the stop tab 222 out of a plane of contact with the drag strut spindle fitting rotational stop 234.

Figure 7:
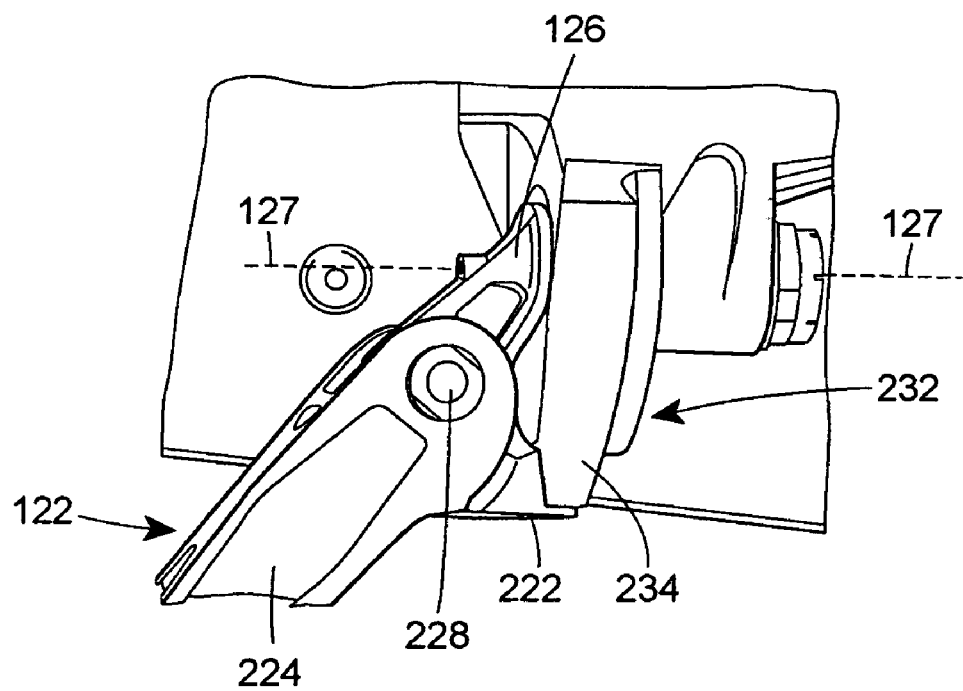
FIG. 7 is an enlarged view of the top of the drag strut, the spindle and the drag strut spindle fitting from the rear looking towards the front of the aircraft.

FIG. 7 is an enlarged view of the top of the drag strut 122, the spindle 126 and the drag strut spindle fitting 232 from the rear of the aircraft looking forward. During normal main landing gear retraction, the drag strut 122 may pivot in a clockwise direction (as viewed in FIG. 7) about the fuse pin axis 229 prior to rotating counter-clockwise (as viewed in FIG. 6) about the spindle axis 127, thereby moving the stop tab 222 out of a plane of contact with the drag strut spindle fitting rotational stop 234. During an overload condition, the drag strut 122 may rotate counter-clockwise (as viewed in FIG. 6) about the spindle axis 127 without rotating clockwise (as viewed in FIG. 7) about the fuse pin axis 229, thereby allowing the stop tab 222 to contact the drag strut spindle fitting rotational stop 234 which may prevent further relative rotation of the drag strut 122 about the spindle axis 127.

Figure 8:
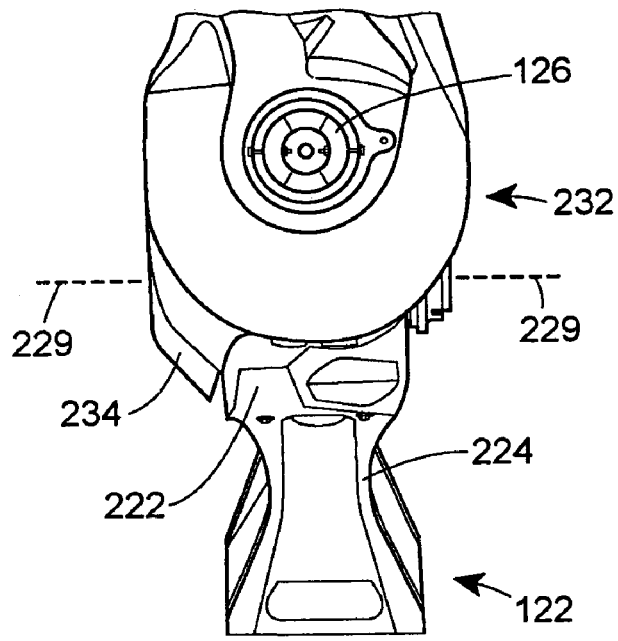
FIG. 8 is an enlarged view of the top of the drag strut, the spindle and the drag strut spindle fitting from inboard looking outboard down the axis of the spindle.

FIG. 8 is an enlarged view of the top of the drag strut 122, the spindle 126, and the drag strut spindle fitting 232 from the inboard side of the fitting looking outboard parallel to the spindle axis 127. In this view, as the drag strut 122 rotates clockwise, the stop tab 222 may contact the drag strut spindle fitting rotational stop 234 and may prevent further relative rotation of the drag strut 122.

Figure 9:
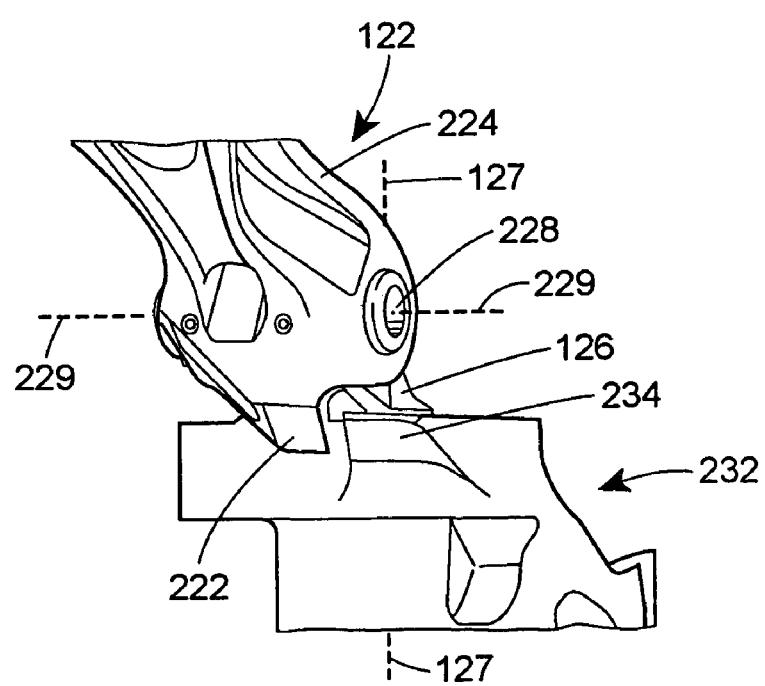
FIG. 9 is an enlarged view of the top of the drag strut, the spindle and the drag strut spindle fitting from underneath looking up normal to the axis of the spindle.

FIG. 9 is an enlarged view of the top of the drag strut 122, the spindle 126, and the drag strut spindle fitting 232 from the bottom looking up, normal to the spindle axis 127. In this view, as the drag strut 122 rotates left to right, the stop tab 222 may contact the drag strut spindle fitting rotational stop 234 and prevent further relative rotation.

Figure 10:
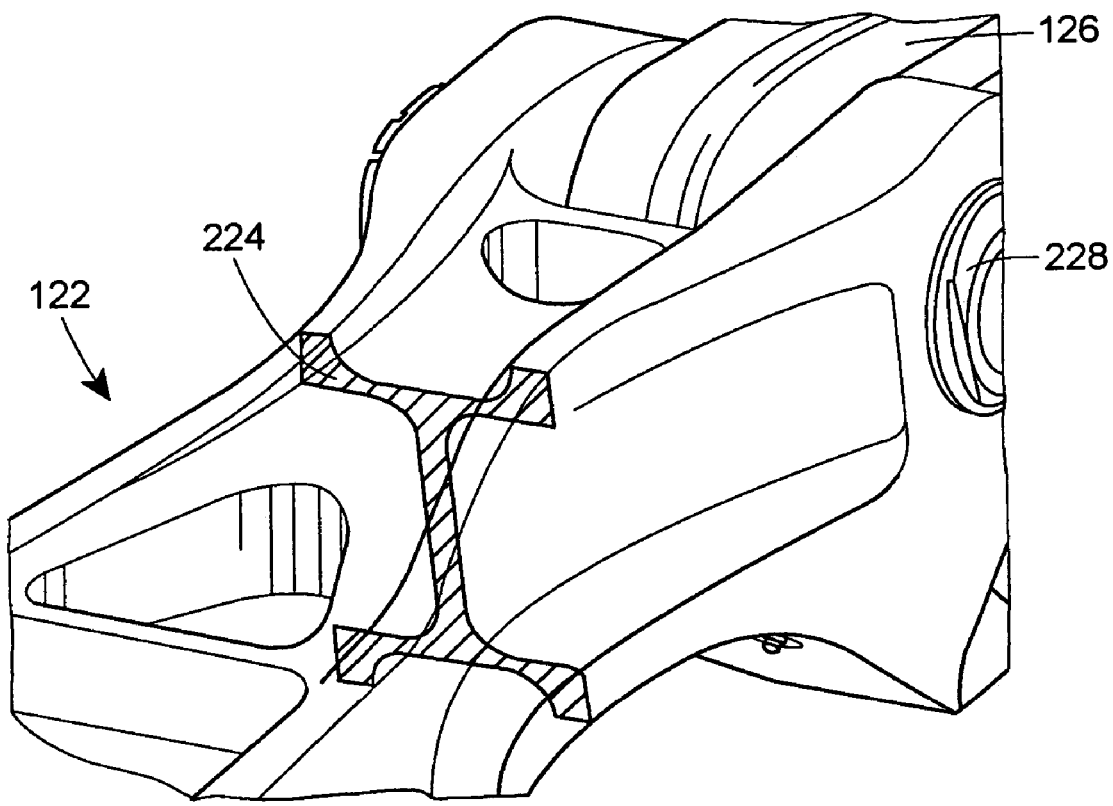
FIG. 10 is an enlarged view of the necked down I-beam section of the drag strut.

FIG. 10 is an enlarged view of the drag strut 122, specifically showing the necked down I-beam section 224, the spindle 126 and part of the fuse pin 228.

One embodiment of this invention applies to an aircraft landing gear, although the invention could be incorporated into any machine for which it is desirable to have components fail in a predictable manner when exposed to an overload condition, such as, for example, a motor vehicle. In one embodiment, when the aircraft main landing gear assembly 30 experiences a vertical overload condition (see FIG. 2), the drag strut 122 may be the last component to fail. In this situation, as the other components fail, the drag strut 122 may rotate in a counter-clockwise direction as oriented in FIG. 2 about the spindle axis 127. This may cause the main landing gear assembly 30 to be pulled towards the fuselage 22 which may cause the main landing gear assembly 30 to contact the fuselage 22, possibly damaging the aircraft 20. Preferred departure of the main landing gear assembly 30 may be directly aft, or aft and slightly away from the fuselage 22, for example, to avoid rupturing one or more fuel tanks that may be disposed within the fuselage 22. Tensile and compressive loads during a vertical overload condition may not be significant enough to cause the drag strut 122 to fail. A better method may be to design the drag strut 122 to fail in a bending mode prior to the failure of shock strut forward trunnion 138. If the drag strut 122 fails before the shock strut forward trunnion 138 fails, the main landing gear assembly 30 may not be pulled inboard towards the fuselage.

One way to generate a bending load sufficient to fail the drag strut 122 in bending may be to stop the rotation of the drag strut 122 about the spindle axis 127. This may transform the vertical load into a bending moment about the spindle axis 127. The drag strut 122 may be designed with a localized geometric feature, in one embodiment a necked down I-beam section 224, which may allow a predictable bending failure of the drag strut 122. The drag strut 122 may be manufactured from a strong brittle material so that there is little or no deformation prior to failure. There are many different ways to stop the rotation of the drag strut 122 about the spindle axis 127. One embodiment uses a stop tab 222 (see FIG. 7) and a drag strut spindle fitting rotational stop 234, however any other suitable means to stop rotation may be employed, such as, for example, a brake (disk, drum or band type), a clutch, a pin, and/or any other means that is sufficient to stop the relative rotation.

Figure 11:
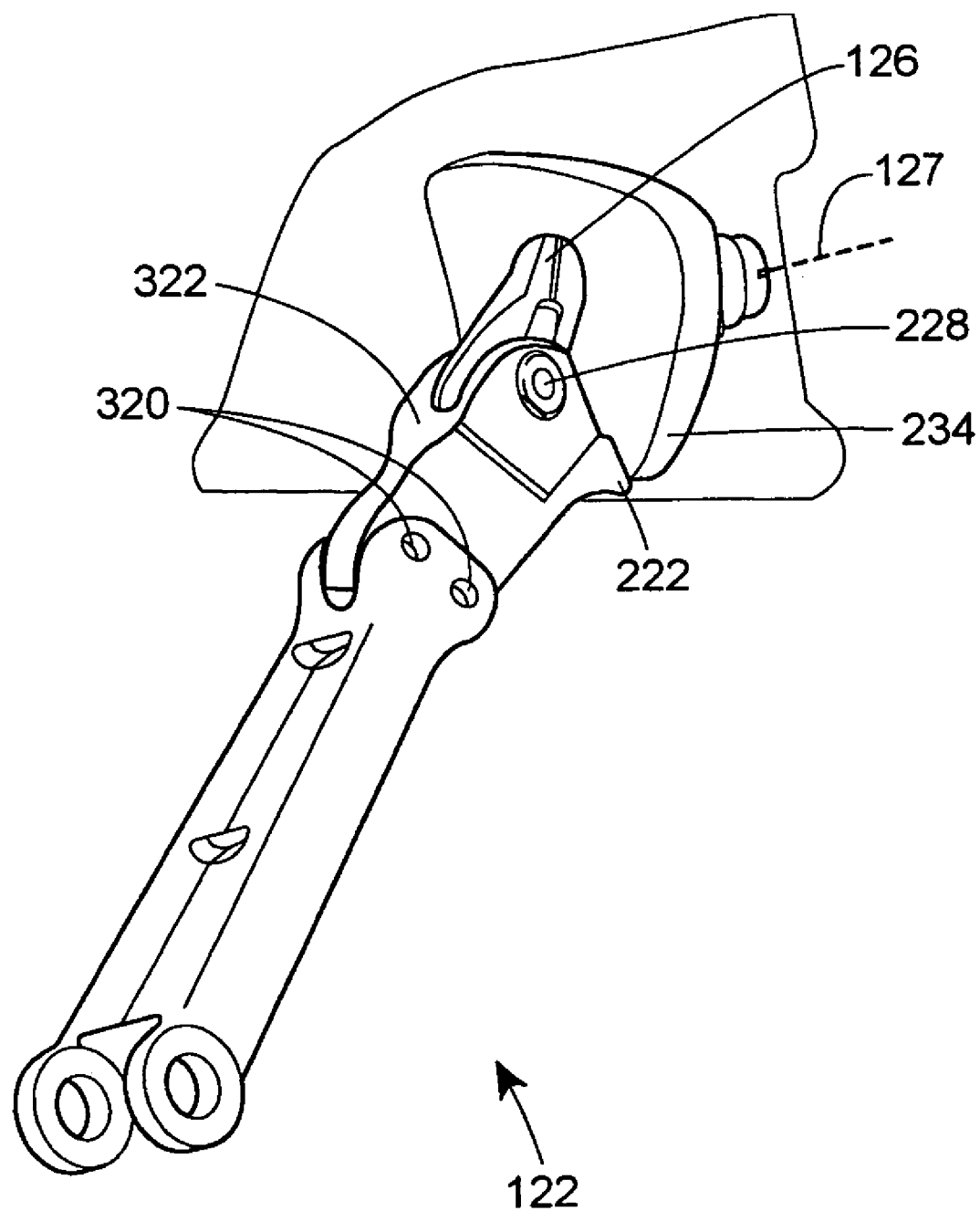
FIG. 11 depicts an alternative embodiment, viewing the top of the drag strut, spindle, drag strut spindle fitting and an alternative upper section with dual fuse pins.

FIG. 11 shows an alternative embodiment of the invention. The drag strut 122 may be connected to an upper section 322 by dual fuse pins 320. In this embodiment the dual fuse pins 320 may be longitudinally parallel to the fuse pin 228, in other embodiments, the dual fuse pins 320 may be longitudinally perpendicular to the fuse pin 228. The upper section 322 may be connected to the spindle 126 by the fuse pin 228. The stop tab 222 may be connected to the upper section 322. As the drag strut 122 rotates counterclockwise (as viewed in FIG. 11) about the spindle axis 127, the stop tab 222 may contact the drag strut spindle fitting rotational stop 234 and may prevent further relative rotation. In one embodiment, instead of using a necked down I-beam section 224, as used in the embodiment of FIG. 5-10, failure may occur in the dual fuse pins 320 which connect the drag strut 122 to the upper section 322.

Figure 12:
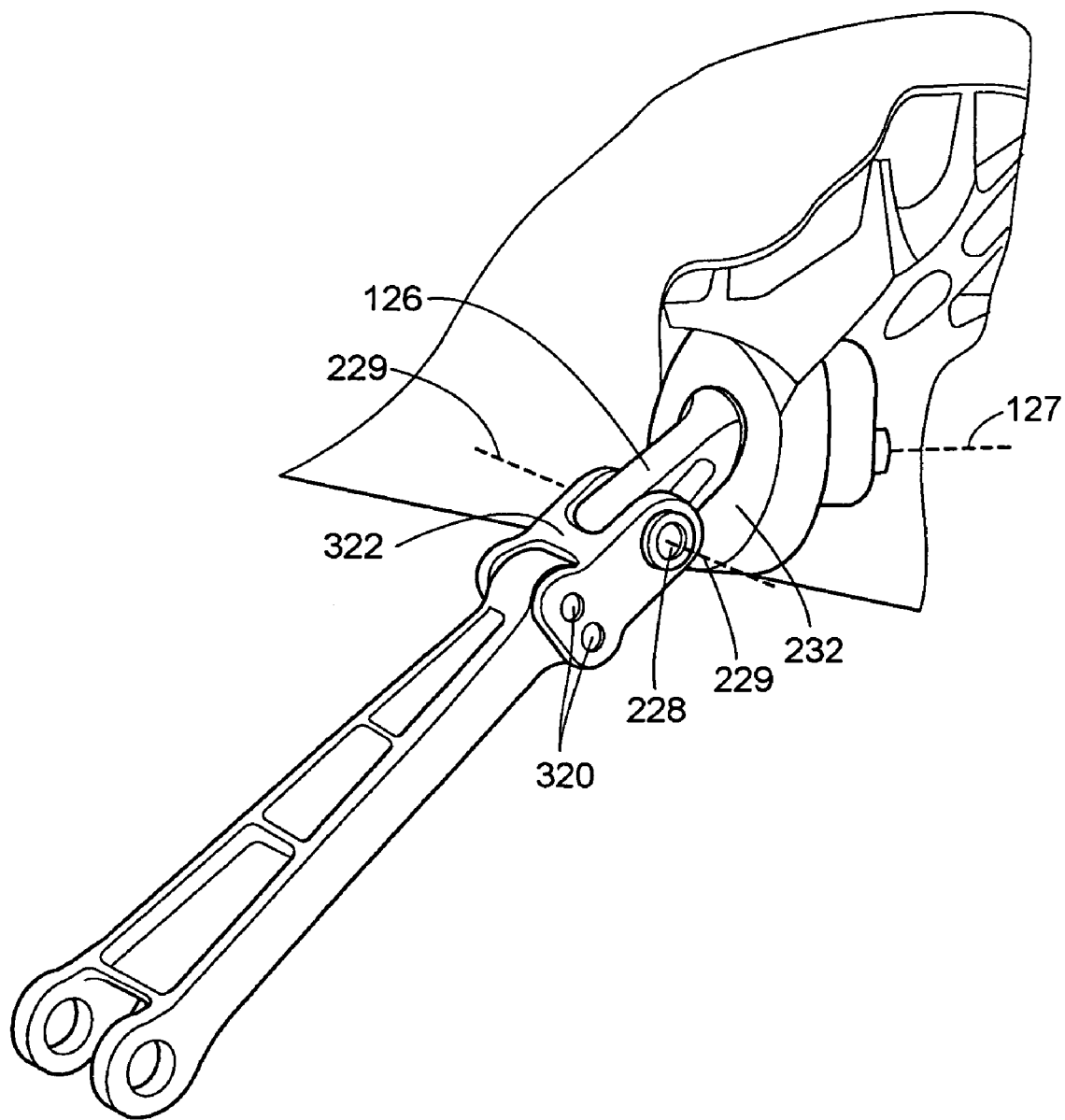
FIG. 12 depicts a further alternative embodiment, showing the top of the drag strut, spindle, drag strut spindle fitting and alternate upper section with dual fuse pins.

FIG. 12 shows another alternative embodiment of the invention. The drag strut 122 may be connected to an upper section 322 with dual fuse pins 320. The upper section 322 may be connected to the spindle 126 by the fuse pin 228. This embodiment may lack a stop tab 222 and a rotational stop 234. Instead, rotation may be restricted about the fuse pin axis 229.

Figure 13:
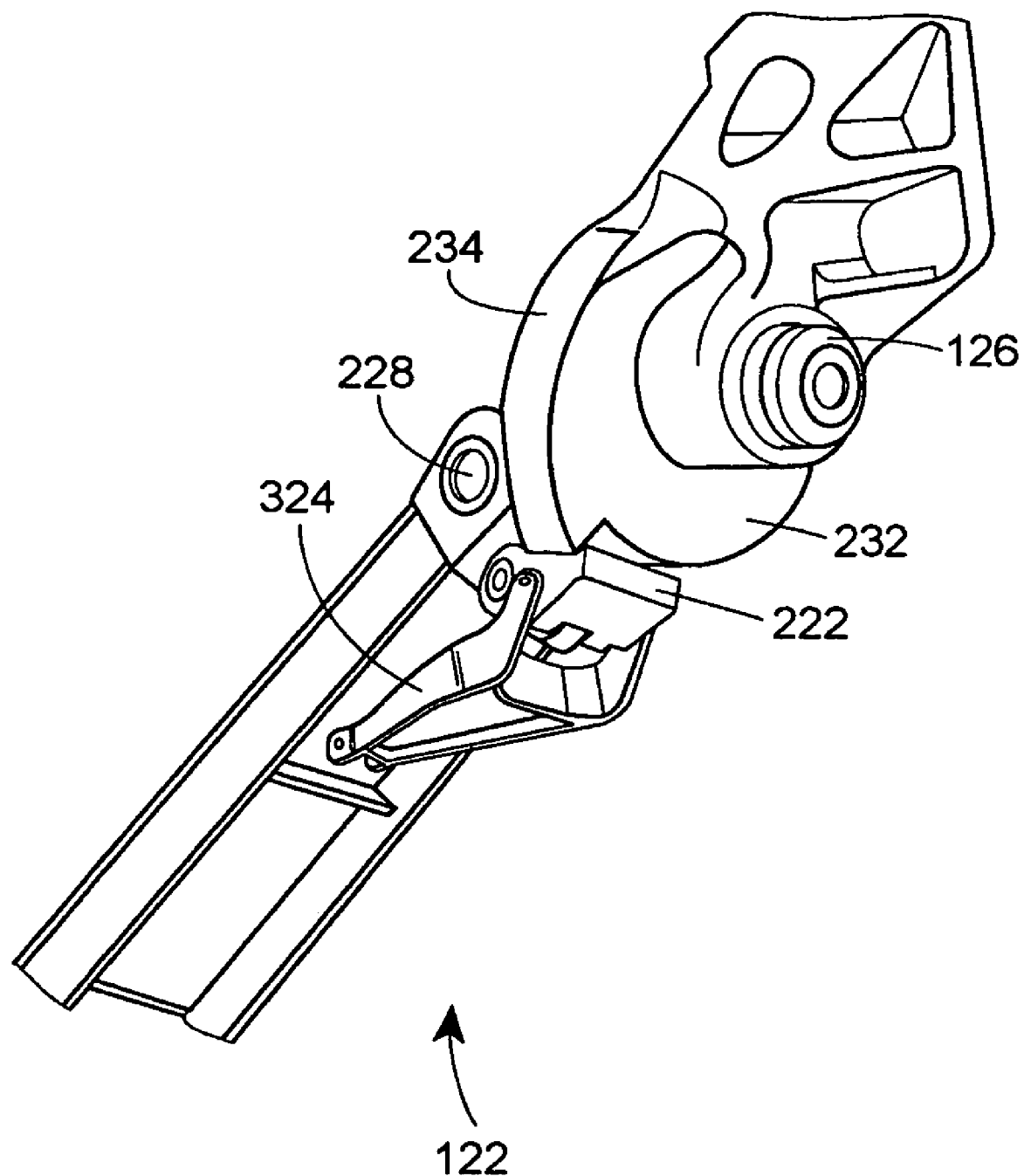
FIG. 13 depicts another alternative embodiment wherein the stop tab is connected to the spindle instead of the drag strut.

FIG. 13 shows yet another alternative embodiment of the invention. The drag strut 122 may be connected to the spindle 126 by the fuse pin 228. In this embodiment, the stop tab 222 may be a separate component, attached to the spindle 126 (see FIG. 14) and may be retracted during normal main landing gear 30 retraction by a stop tab articulator 324 which is attached to the drag strut 122.

Figure 14:
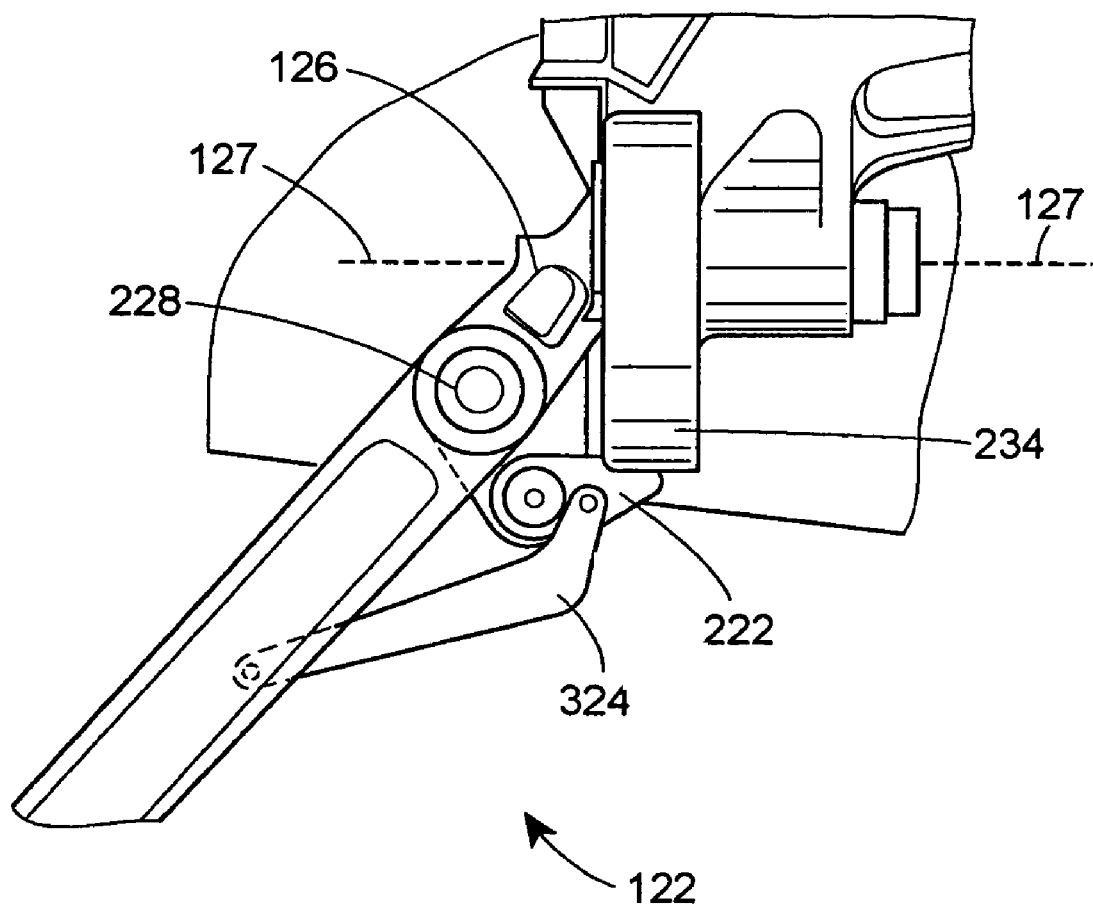
FIG. 14 depicts the embodiment from FIG. 13 looking forward along the axis of the fuse pin.

FIG. 14 is a view of the embodiment of FIG. 13 as viewed from the rear of the aircraft 20 looking forward. The stop tab 222 may be connected to the spindle 126 and may be retracted during normal gear retraction by a stop tab articulator 324 which may be attached to the drag strut 122.

The features, functions, and advantages can be achieved independently in various embodiments of the present invention, or may be combined in yet other embodiments.

What is claimed is:

1. An aircraft landing gear assembly comprising:
   a shock strut;
   a drag strut spindle fitting having a drag strut spindle fitting rotational stop;
   a drag strut having a stop tab and connected to said shock strut and said drag strut spindle fitting.

2. An aircraft landing gear assembly according to claim 1, wherein said stop tab and said drag strut spindle fitting rotational stop contact each other under an overload condition.

3. An aircraft landing gear assembly according to claim 2, wherein said drag strut materially fails in a bending mode during said overload condition.

4. An aircraft landing gear assembly according to claim 3, wherein said drag strut further includes a necked down section.

5. An aircraft landing gear assembly according to claim 3, wherein movement of said drag strut moves said stop tab out of a plane of contact with said drag strut spindle fitting rotational stop during at least one normal operating condition.

6. An aircraft landing gear assembly according to claim 5, wherein said normal operating condition is landing gear retraction.

7. An aircraft landing gear assembly according to claim 3, wherein said drag strut is manufactured from a strong and brittle material.

8. An aircraft landing gear assembly according to claim 7, wherein said strong and brittle material is Titanium alloy 10V-2Fe-3Al.

* * * * *